United States Patent
Chao et al.

(10) Patent No.: US 9,317,921 B2
(45) Date of Patent: Apr. 19, 2016

(54) SPEED-UP TEMPLATE MATCHING USING PERIPHERAL INFORMATION

(71) Applicant: QUALCOMM Incorporated, San Diego, CA (US)

(72) Inventors: Hui Chao, San Jose, CA (US); Raghuraman Krishnamoorthi, San Diego, CA (US); Faraz Mohammad Mirzaei, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/328,308

(22) Filed: Jul. 10, 2014

(65) Prior Publication Data

US 2016/0012593 A1 Jan. 14, 2016

(51) Int. Cl.
  *G06K 9/62* (2006.01)
  *G06T 7/00* (2006.01)
  *G06K 9/46* (2006.01)

(52) U.S. Cl.
  CPC ............ *G06T 7/0042* (2013.01); *G06K 9/4604* (2013.01); *G06K 9/6202* (2013.01); *G06T 7/003* (2013.01); *G06T 7/0044* (2013.01); *G06K 2209/25* (2013.01); *G06K 2209/27* (2013.01); *G06T 2207/10004* (2013.01); *G06T 2207/30244* (2013.01)

(58) Field of Classification Search
  CPC .......... G06K 2209/25; G06K 2209/27; G06K 9/4604; G06K 9/6202; G06T 2207/10004; G06T 2207/30244; G06T 7/0042
  USPC ........................................................ 382/209
  See application file for complete search history.

(56) References Cited

U.S. PATENT DOCUMENTS

| 8,166,391 B2 | 4/2012 | Kaneko |
| 8,401,276 B1 | 3/2013 | Choe et al. |
| 8,555,315 B2 | 10/2013 | Woods et al. |
| 2005/0002558 A1 | 1/2005 | Franke et al. |
| 2009/0110267 A1* | 4/2009 | Zakhor et al. ......... G06T 7/0046 382/154 |
| 2013/0322767 A1 | 12/2013 | Chao et al. |

FOREIGN PATENT DOCUMENTS

| WO | WO-2011048497 A2 | 4/2011 |
| WO | WO-2013086475 A1 | 6/2013 |

OTHER PUBLICATIONS

Bonin-Font, F., et al., "Visual Navigation for Mobile Robots: A Survey", Journal of Intelligent and Robotic Systems, vol. 53, No. 3, May 1, 2008, pp. 263-296.
International Search Report and Written Opinion—PCT/US2015/034049—ISA/EPO—Sep. 11, 2015.

* cited by examiner

*Primary Examiner* — Manuchehr Rahmjoo
(74) *Attorney, Agent, or Firm* — Kilpatrick Townsend & Stockton LLP

(57) ABSTRACT

A method for template matching is described. In one implementation, an image including a target object is captured by a camera. A pose of the camera is estimated based, at least in part, on peripheral information from the image. Pre-selecting is performed on a set of pose templates by matching the pose of the camera to poses associated with pose templates to identify a set of matching pose templates. The template matching for the target object is then performed using the set of matching pose templates.

24 Claims, 14 Drawing Sheets

SPEED-UP TEMPLATE MATCHING USING PERIPHERAL INFORMATION

FIELD

Aspects of the disclosure relate to image processing. In particular, certain implementations relate to speed-up template matching using peripheral information from an image and/or from a device which captures the image to remove certain templates from the matching process. Particular implementations related to location services are also described.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are utilized to obtain and locate the position of a wireless communication device. For instance, location based services (LBSs) leverage the location of an associated device to provide controls for one or more applications running on the device. Applications of LBS functionality implemented with respect to wireless communication devices include personal navigation, social networking, targeting of content (e.g., advertisements, search results, etc.), among others.

SUMMARY

Aspects of the disclosure relate to systems, methods, devices, and products for estimating a camera pose. One implementation of such a method comprises obtaining an image of a location captured via a camera, wherein the image includes a target object and peripheral information; calculating a pose of the camera with respect to the target object based at least in part on the peripheral information; accessing a template matching system, wherein the template matching system comprises a plurality of templates for each object of a plurality of objects, and wherein each template is associated with a template pose; pre-selecting templates of the plurality of templates where the pose of the camera matches the template pose to identify a set of matching pose templates; and processing the set of matching pose templates to identify a template match with the target object.

Another such implementation may function where the peripheral information comprises vanishing point information derived from processing the image. Another such implementation may function where the peripheral information further comprises sensor information collected by a mobile device, wherein the mobile device comprises the camera. Another such implementation may function where the sensor information comprises accelerometer data, and wherein the peripheral information comprises a gravity vector determined, at least in part, from the accelerometer data. Another such implementation may function where the peripheral information consists of at least two horizontal vanishing points. Another such implementation may function where the peripheral information consists of one horizontal vanishing point and a gravity vector.

Another such implementation may function where pre-selecting templates of the plurality of templates where the pose of the camera matches the template pose to identify the set of matching pose templates comprises: identifying templates of the plurality of templates with a difference in pose angle of less than a threshold amount; and selecting the templates of the plurality of templates with the difference in pose angle of less than the threshold amount as the set of matching pose templates.

Another such implementation may function where pre-selecting templates of the plurality of templates where the pose of the camera matches the template pose to identify the set of matching pose templates comprises: for each object represented by at least template of the plurality of templates, determining the template associated with each object that differs from the pose of the camera by a smallest amount; and selecting the template associated with each object that differs from the pose of the camera by the smallest amount as part of the set of matching pose templates.

Another such implementation may further comprise: identifying location information associated with the template matching the target object; and estimating the location of the camera based on the location information associated with the template matching the target object and the pose of the camera. Another such implementation may further comprise: providing location based services to a mobile device comprising the camera based on the location of the camera.

Another such implementation may function where the target object comprises a store logo. Another such implementation may function where calculating the pose of the camera with respect to the target object based at least in part on the peripheral information comprises: processing the image to identify a plurality of edge line features of the image. Another such implementation may function where detecting the plurality of edge line features comprises detecting horizontal edge line features and vertical edge line features. Another such implementation may function where detecting the plurality of edge line features comprises detecting at least one of a floor, a roof, or a door.

Another such implementation may function where calculating the pose of the camera comprises calculating the pose of the camera as at least one of pan, tilt, or roll with respect to a plane, defined with respect to the target object in the image, based on the peripheral information.

Another such implementation may be a mobile device for accelerated template matching using peripheral information comprising: a processor; a camera coupled to the processor; and a memory coupled to the processor, wherein the memory comprises instructions that cause the processor to: obtain an image of a location captured via the camera, wherein the image includes a target object and at least a portion of the peripheral information; calculate a pose of the camera with respect to the target object based at least in part on the peripheral information; access a template matching system, wherein the template matching system comprises a plurality of templates for each object of a plurality of objects, and wherein each template is associated with a template pose; pre-select templates of the plurality of templates where the pose of the camera matches the template pose to identify a set of matching pose templates; and process the set of matching pose templates to identify a template match with the target object.

Another such implementation be a device further comprising a display, wherein the instructions further cause the processor to determine the location associated with the template matching the target object, and to display an estimated location of the mobile device based on the location associated with the template matching the target object.

Another such implementation be a device an accelerometer, wherein the instructions further cause the processor to identify a gravity vector based on sensor data from the accelerometer, and to calculate the pose of the camera with respect to the target object using the gravity vector in conjunction with the peripheral information from the image.

Another implementation may be a non-transitory computer-readable storage device comprising instructions that, when executed by a processor, cause a system to perform a method of template matching, the method comprising: obtaining an image of a location captured via a camera, wherein the image includes a target object and peripheral information; calculating a pose of the camera with respect to the target object based at least in part on the peripheral information; accessing a template matching system, wherein the template matching system comprises a plurality of templates for each object of a plurality of objects, and wherein each template is associated with a template pose; pre-selecting templates of the plurality of templates where the pose of the camera matches the template pose to identify a set of matching pose templates; and processing the set of matching pose templates to identify a template match with the target object.

Additional such implementations may function where accessing the template matching system comprises communicating, via a wireless network, a request from a mobile device comprising the camera to a server system comprising a database that includes the plurality of templates.

Further implementations will be apparent in view of the detailed descriptions provided below.

DETAILED DESCRIPTION

Figure 1:
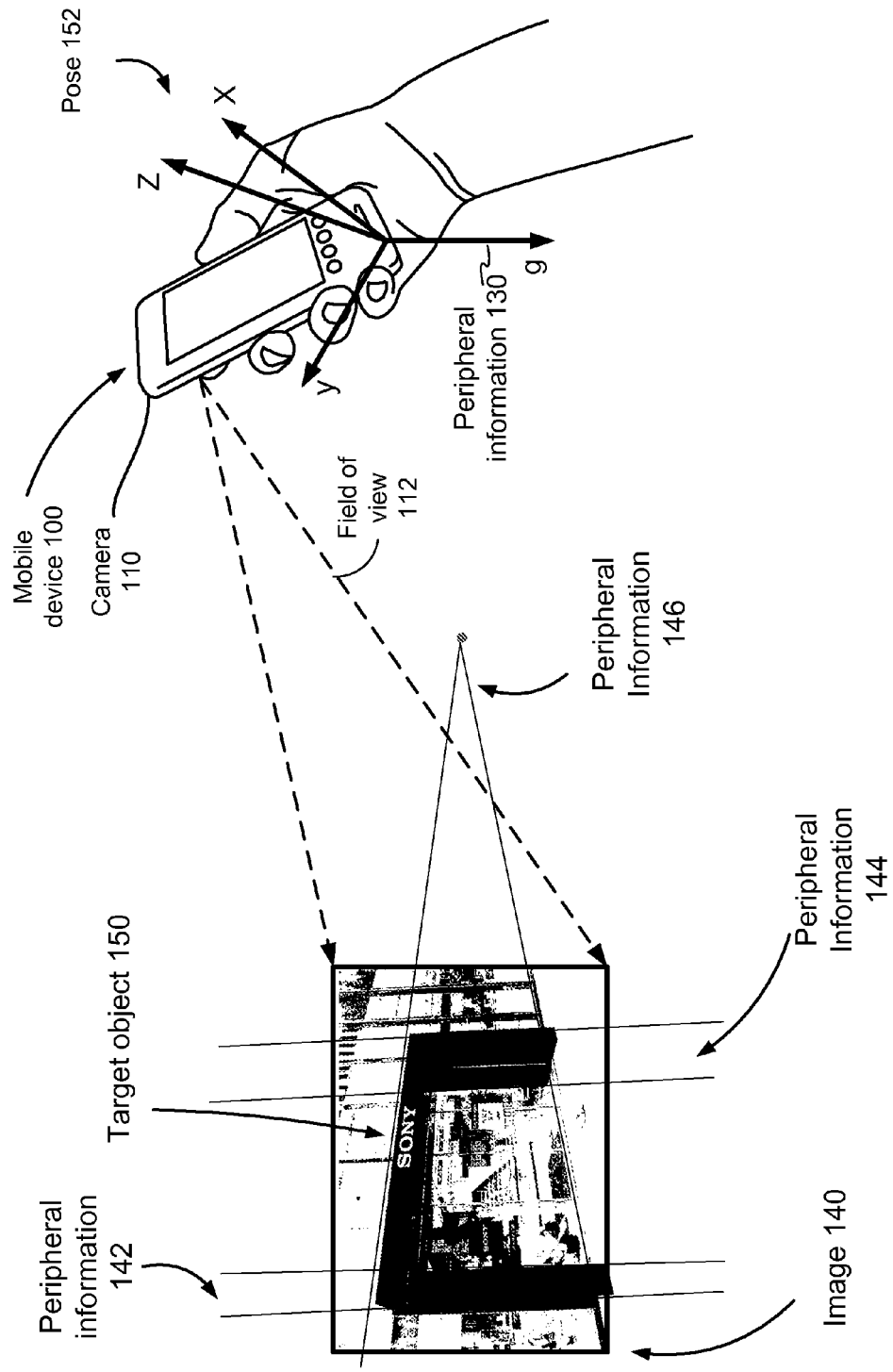
FIG. 1 is an illustration of aspects of a system for template matching according to one implementation.

The following relates to image processing and template matching. Certain particular implementations describe systems and methods for identifying storefront logos using particular techniques to speed up the template matching process.

Storefronts are often used as landmarks for positioning and for location based service. Being able to recognize a brand at a storefront will benefit various applications such as location services and location based advertising. Template matching is one potential method for object detection. In standard systems, multiple templates based on different viewing angles, also referred to as "poses," are prepared during training, and each template is matched against the test image. In certain implementations, the pose estimated may be a camera rotation angle, a camera translation, or any partial or complete description of a cameras position and orientation in space relative to other objects or frames of reference. The process of matching a target object from a camera image against multiple poses for possible matches involves a large amount of processing, which results in a slow process. By pre-filtering a significant portion of the stored templates and limiting the processing involved in determining a match between the target logo and a template, systems and methods described herein may reduce processor usage and provide faster matching.

For example, one system may be implemented by a mall environment with 50 different target objects identified in the environment. The target objects may be store logos, signage, or any other marker that may be identified by template matching. A template matching system may create templates for each of the fifty different target objects. Each target object has one or more associated templates, where each template also has an associated pose that provides information about the viewing angle that was used to create the template. If each target object is provided templates from ten different poses, the system will have five hundred templates. When a user takes a picture of a store logo in the mall area that is one of the target objects, the system will user peripheral information to associate a pose with the picture. Instead of matching the target object from the picture against all five hundred templates, the system will filter the templates to include only those with an associated pose matching the pose of the picture. Ideally, this will limit the number of templates to be matched against the picture to fifty, which significantly reduces the average time and computing resources needed to find a match between the picture and the corresponding template.

As described herein, "peripheral information" refers to information which may be used to determine or to assist in determining a pose or reference angle associated with an image of a target object.

A "target object" as referred to herein refers to an image or a portion of an image which is an identifiable object and used within a matching system as an object which may be matched to a template. Examples of target objects include store logos and signs.

FIG. 1 illustrates aspects of an implementation of a system for improved template matching. FIG. 1 includes a handheld mobile device 100 that includes a camera 110 with an associated field of view 112 which is used to capture an image 140 of a target object 150 from a relative position of a pose 152. Pose 152 may be considered to be the position in space and the orientation of mobile device 100 with respect to the target object 150 captured in image 140. This may include information about how close or far from target object 150 the mobile device 100 is when image 140 is captured. This may also include information about any tilt, pan, roll, or any other description which may be used to quantify the relative position between mobile device 100 and target object 150 when image 140 is captured. Additional details and examples of a pose are discussed below, particularly with respect to FIGS. 7, 8, 9, 10A, and 10B.

An example image 140 taken by the camera 110 of the scene viewable through the camera 110 is provided. Details of image 140 may be analyzed as or used to create peripheral information. Examples of peripheral information are shown in FIG. 1 as parallel line peripheral information 142, parallel line peripheral information 144, and vanishing point peripheral information 146. Additional details related to the use and creation of peripheral information from an image are discussed in more detail below.

The mobile device 100 also includes an accelerometer or other sensor that provides measurements from which a gravity vector, shown as peripheral information 130, may be determined. Additional details of how a gravity vector such as peripheral information 130 may be used in conjunction with information from an image such as peripheral information 142, 144, and 146 is also discussed in more detail below.

Figure 2:
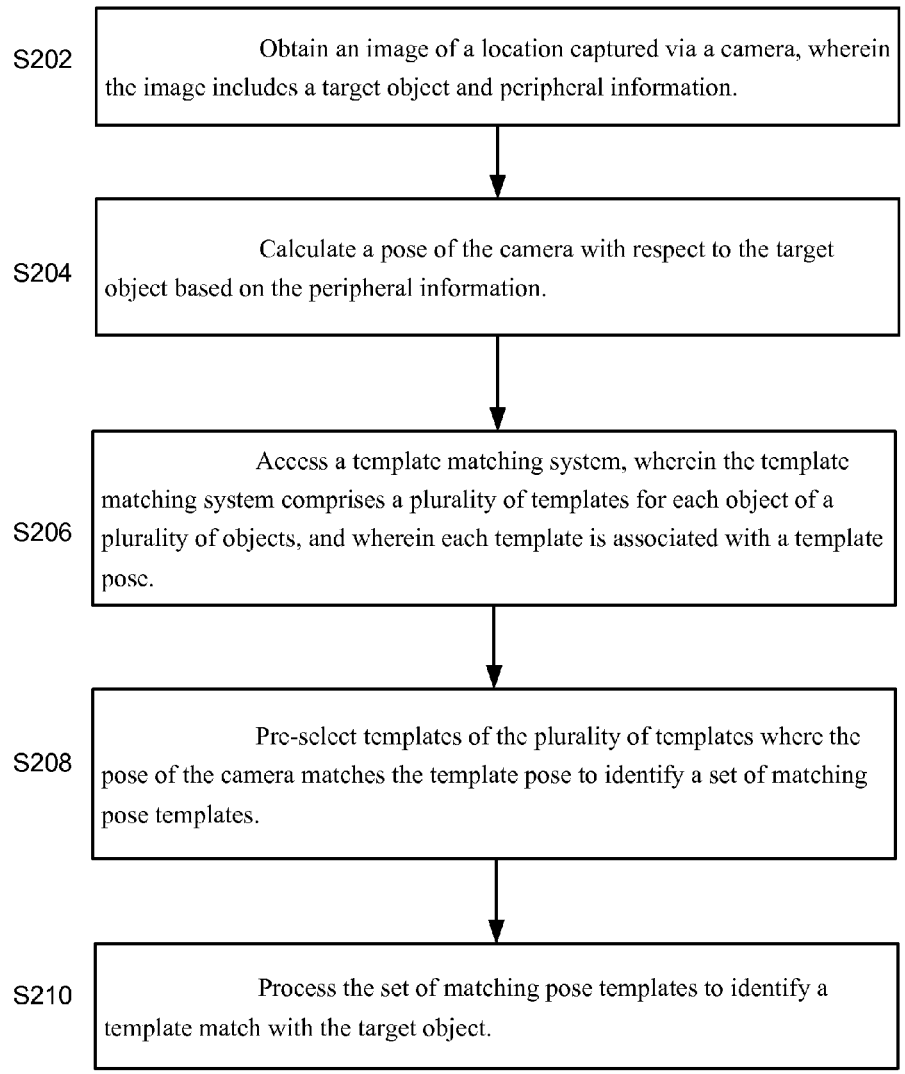
FIG. 2 is a method of template matching according to one potential implementation.

FIG. 2 now describes one potential method of speed-up template matching using peripheral information. S202 involves obtaining an image, such as image 140, of a location captured via a camera such as camera 110. The image includes a target object such as target object 150, and peripheral information such as peripheral information 142, 144, and/or 146. Alternative implementations may use peripheral information which is not from the image, such as peripheral information 130 from a sensor of mobile device 100.

Figure 3A:
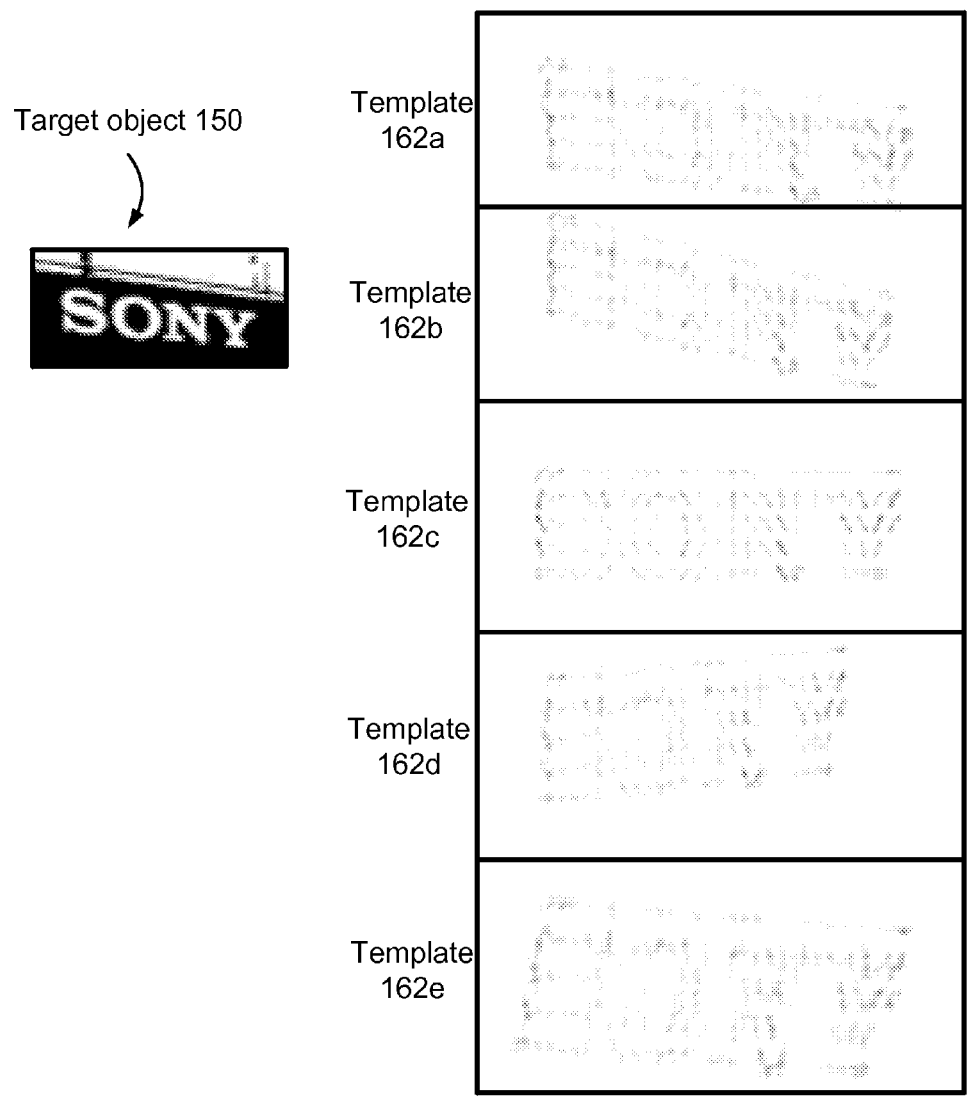
FIG. 3A illustrates aspects of a template matching system according to one implementation.
Figure 3B:
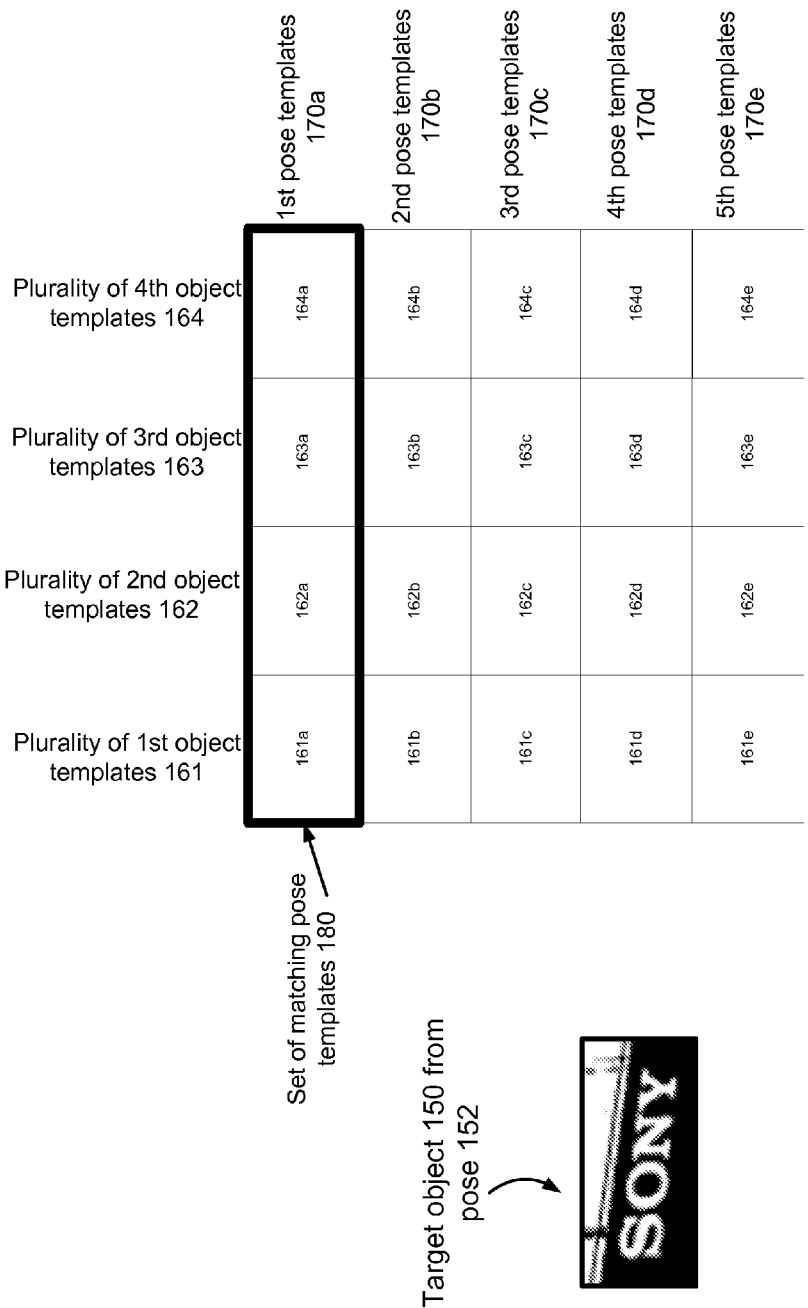
FIG. 3B illustrates aspects of a template matching system according to one implementation.

S204 involves calculating a pose of the camera with respect to the target object based at least in part on the peripheral information. Non-limiting example details related to such calculations are discussed below with respect to FIGS. 5-10. S206 involves accessing a template matching system, wherein the template matching system comprises a plurality of templates for each object of a plurality of objects, and wherein each template is associated with a template pose. FIGS. 3A and 3B describe aspects of one potential template matching system. Any such template matching system will include multiple templates for at least some of the objects structured to be matched by the system. The multiple templates for a particular object provide different perspective views of the object, such that the different templates showing the object from different views will match pictures of the object taken from different camera pose positions. Such templates showing different perspectives may be referred to as pose templates. Templates for different objects associated with the same view perspective or pose may be referred to as matching pose templates.

S208 involves pre-selecting templates of the plurality of templates where the pose of the camera matches the template pose to identify a set of matching pose templates. In certain implementations, the template matching system may have previously structured the template data into groups of matching pose templates. In other implementations, the templates may simply be stored with pose information. In such implementations, the system may have a pose threshold, where S208 involves identifying all pose templates that are within the threshold distance of the camera pose. Such a threshold distance may be a certain angle of rotation difference, or any similar comparison between the pose templates and the calculated pose of the camera that was used to capture the image including the target object. In such implementations, if a calculated pose of the camera is between two template poses, the system may attempt to match the target object against two pose templates for the same object. In still further implementations, the template matching system may identify the pose template which has the closest pose or perspective angle. In additional implementations, three or more pose templates for a single object may be used, as long as certain pose templates for the single object are pre-filtered, such that the remaining three or more pose templates that are used still result in a speed-up of the matching process over the systems which would use all of the pose templates for the single object. In still further implementations, when a sufficient difference exists between the pose of the camera and the pose of the closest pose template, the system may adjust the requirements necessary for a match based on the pose mismatch.

In S210, then, the method includes processing the set of matching pose templates to identify a match with the target object. Such processing may involve any number of different template matching techniques to match the template to the target object. In certain implementations, after the match is identified between a particular pose template and the target object, supplemental information associated with the particular pose template may be identified and used by a system. For example, the particular pose may be associated with a specific location. The camera pose, target object size, and specific location information may be used to identify a camera location associated with the image. The system may then provide map information, direction information, targeted advertising, or other such device functionality or user communications based on this additional information. In still further implementations, the camera location may be communicated to a store owner or aggregated by the system for further analysis.

FIG. 3A then shows details of target object 150 and a plurality of pose templates 162*a-e* which are created from an object matching target object 150. In various implementations, pose templates 162 may be created by a device photographing an instance of the object from multiple poses and recording the poses along with the images. The images may then be processed to create pose templates 162*a-e*. In alternative implementations, a single instance of an object may be processed using transforms to create templates associated with different poses.

As shown in FIG. 3A, a pose template is not merely a copy of the object, but may include certain details or similarities which allow a template matching system to match the pose template to a target object version of the object that was the basis for the pose template. For the purpose of explanation, template 162*a* of FIGS. 3A and 3B will be defined as the pose template that most closely matches target object 150.

FIG. 3B then shows target object 150 again. As shown by FIG. 1 and described here, target object 150 was captured in an image 140 by a mobile device 100 with a camera 110 from pose 152, which describes the relative position between the capturing camera and the target object 150. In the implementation described in FIG. 2, this pose is determined in S204 using, at least in part, peripheral information. Examples of this process are described below. After the camera pose is determined, the implementation of FIG. 2 proceeds to S206 where a template matching system is accessed. FIG. 3B further illustrates one potential template matching system which includes templates for four objects, which are shown as templates 161 through 164. In the implementation of FIG. 3B, the illustrated template matching system includes five different poses for each of the four objects, for a total of twenty pose templates. For illustrative purposes, the templates are shown in a chart, where the pose templates in a column are templates for the same object. In FIG. 3, a first, second, third, and fourth templates 161 through 164 are shown. Templates in the same row are templates for different objects with the same associated pose, shown as $1^{st}$ through $5^{th}$ pose templates 170a-e. For the purposes of illustration, each group of pose templates is defined as having the same pose, though in different implementations, different groupings of poses may be used. As illustrated by FIG. 3B then, after pose 152 is identified, pose 152 is compared with the poses of $1^{st}$ through $5^{th}$ pose templates 170a-e. In the implementation of FIG. 3B, pose 152 matches the pose of $1^{st}$ pose templates 170a. Templates 161a, 162a, 163a, and 164a thus each have the same pose as target object 150, and these templates are identified as a set of matching pose templates 180. The other templates may then be excluded from consideration. Rather than processing each of the twenty templates of FIG. 3B, the template matching system may simply match the four templates of the set of matching pose templates 180 against target object 150. Assuming no errors, template 162a, which is shown as the template for the object represented by target object 150, should be matched.

Figure 4:
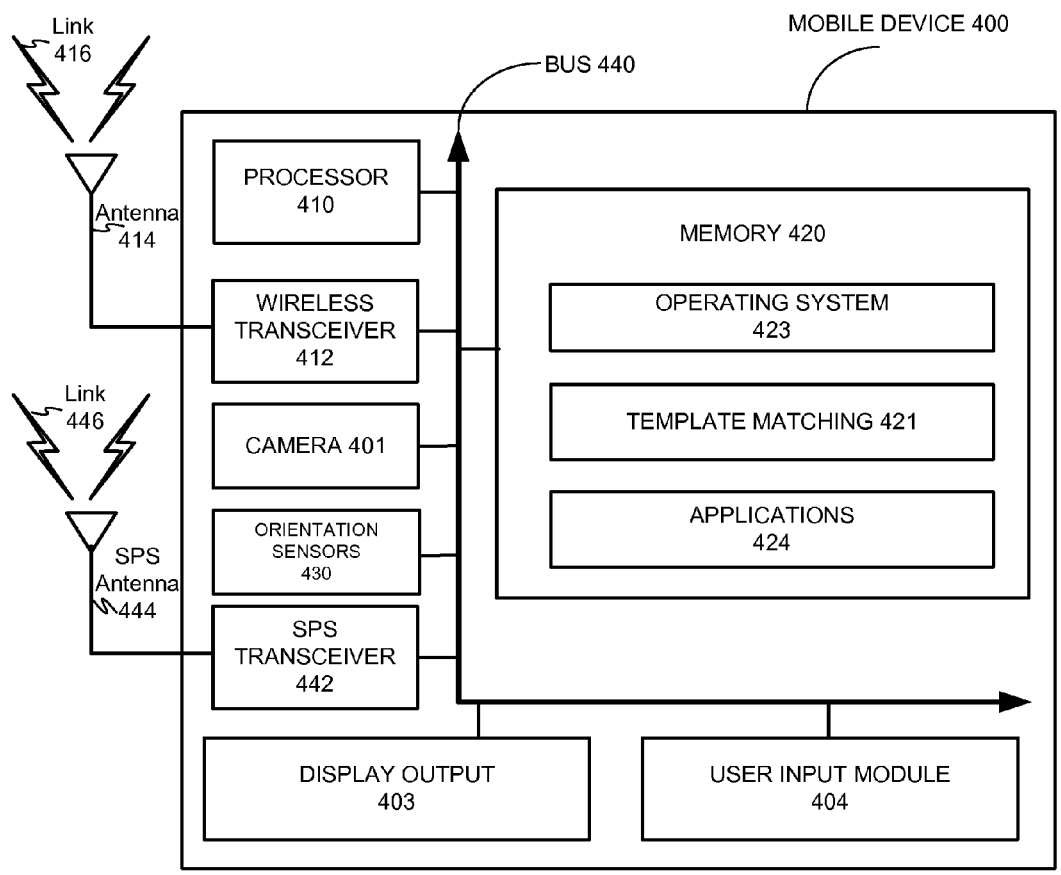
FIG. 4 illustrates an implementation of a mobile device that may operate in accordance with one implementation.

FIG. 4 shows one potential implementation of a mobile device 400 that may be similar to mobile device 100 of FIG. 1. Further, mobile device 400 may also implement all or part of a speed-up template matching system using peripheral information as described herein. This may be done using template matching 421, which may comprise all or part of a template matching system which stores pose templates and implements processes to match target objects captured by camera 401 with the templates stored as part of template matching 421. In some of these implementations, the entire process of a speed-up template matching method such as the one described in FIG. 2 may be performed by mobile device 400 with no specialized processing from any other device. In alternate implementations, at least a portion of the processing and storage used for matching pose templates with a target object may be performed by remote networked elements such as those described in FIG. 13.

In the implementation shown in FIG. 4, mobile device 400 includes processor 410 configured to execute instructions for performing operations at a number of components and can be, for example, a general-purpose processor or microprocessor suitable for implementation within a portable electronic device. Processor 410 is communicatively coupled with a plurality of components within mobile device 400. To realize this communicative coupling, processor 410 may communicate with the other illustrated components across a bus 440. Bus 440 can be any subsystem adapted to transfer data within mobile device 400. Bus 440 can be a plurality of computer buses and include additional circuitry to transfer data.

Memory 420 may be coupled to processor 410. In some implementations, memory 420 offers both short-term and long-term storage and may in fact be divided into several units. Memory 420 may be volatile, such as static random access memory (SRAM) and/or dynamic random access memory (DRAM), and/or non-volatile, such as read-only memory (ROM), flash memory, and the like. Furthermore, memory 420 can include removable storage devices, such as secure digital (SD) cards. Thus, memory 420 provides storage of computer-readable instructions, data structures, program modules, and other data for mobile device 400. In some implementations, memory 420 may be distributed into different hardware modules.

In some implementations, memory 420 stores applications 424, which may be any number of applications or software programs. Template matching 421 may work in conjunction with any number of other applications 424 as part of a mobile device 400 that implements accelerated template matching in accordance with the implementations described herein. Applications 424 as stored in a non-transitory memory such as memory 420 contain particular instructions to be executed by processor 410. In alternative implementations, other hardware modules may additionally execute certain applications 424 or parts of applications. In certain implementations, memory 420 may additionally include secure memory, which may include additional security controls to prevent copying or other unauthorized access to secure information such as secure locations of target objects or privacy sensitive data associated with template matches.

In some implementations, memory 420 includes an operating system 423. Operating system 423 may be operable to initiate the execution of the instructions provided by applications 424 and/or manage other hardware modules as well as interfaces with communication modules which may use wireless transceiver 412 and to receive information from link 416 via antenna. Operating system 423 may be adapted to perform other operations across the components of mobile device 400 including threading, resource management, data storage control and other similar functionality.

In additional implementations wireless transceiver 412 may receive information from link 416 via antenna 414 which may be passed directly to position/velocity orientation sensors 430 which may include specialized hardware, software, or firmware modules for determining peripheral information that may be used as part of pose determination. As illustrated by FIG. 4, mobile device 400 includes camera 401 and orientation sensors 430. Pose information may be based, at least in part, on peripheral information collected from camera 401 and may also be based, at least in part, on information from orientation sensors 430. Further, additional information may be collected by hardware sensors and modules of mobile device 400. Examples of such information may include Doppler measurements, position determination, acceleration determination, or velocity determination which may be used as part of or in conjunction with peripheral information that determines a pose or verifies other information such as location information derived from a template match. In alternative implementations, signals from antennas may be communicated to a memory 420 for later access and processing by processor 410 and template matching 421 in accordance with the implementations described herein.

In some implementations, the image capturing unit such as camera 110 of the mobile device 100 in FIG. 1 may include a movable camera housing that allows a lens of the camera 110 to point to the side. In such implementations, the device 100 may be configured to move the lens position for camera 110. Movement of the lens position may be required in response to a determination that no peripheral information was detected in a currently captured image, thus resulting in a suggestion being made to the user (e.g., via a user interface) to move the device and/or move the camera's lens on that device. Alternatively, in response to a determination that no peripheral information has been detected in a currently captured image, a controller of the mobile device 100 may automatically cause actuation of a displacement mechanism controlling displacement of camera's lens to thus cause the camera's lens to move to enable capturing of another image in which peripheral information may be detected.

In some implementations, the camera's lens may enable vision based navigation. For example, if the detected vanishing point is identified as a vertical one (which generally is not suitable for determining the device's orientation), by rotating the camera to the side or by changing the location of the lens and the focus, a different set of parallel lines may be detected whose vanishing point corresponds to a non-vertical vector, thus enabling estimation of the orientation of the device. In these cases, an internal mechanism, such as servo motors equipped with encoders, keep track of the relative rotation of the camera or the movement of the lens compared to the default position. The readings from these encoders can be added to the focal length value f in the intrinsic calibration matrix (e.g., in case of translation of the lens), or to compute the orientation of the detected vanishing point with respect to the device's frame of reference (e.g., in case of rotation of the lens and housing).

Capturing an image of a scene (such as the example image 140) may be performed at the discretion of the user carrying the device who may activate the camera, or it may be initiated automatically in response to a determination that some pre-determined interval of time has elapsed. For example, in implementations in which estimated location of a traveling device is determined based on orientation (e.g., heading) and distance travelled computations derived from device sensors, periodic determination of the distance travelled and the present orientation of the device may be performed automatically at such pre-determined intervals. An automatic determination of, for example, the present orientation may include sending instructions/directions to the user where the user's help is required to determine the device's orientation (e.g., requesting the user to raise the camera and activate it to have an exposure of the scene). In some implementations, a screen display may present an image taken with the device's camera to enable the user to point the camera at particular features (e.g., hallways) that are associated with identifiable vanishing points. Once the image of the scene is taken, a vanishing point in the image may be, in some implementations, marked/identified in the captured image displayed on the device's display.

In some implementations, the camera can be periodically sampled to see if some threshold number of lines can be detected in the captured image. If enough lines are detected, further vanishing point computations may be performed. If, however, it is determined that there are insufficient lines to identify/determine a vanishing point in the scene, the camera may automatically capture a new image of the scene, or the user may be prompted to take a new image (e.g., position the camera in a direction where there is a higher likelihood of identifying sufficient number of lines in the captured image so at least one vanishing point can be determined). In some implementations, an on-screen camera sign or other indication (e.g., an audio indication such as a buzz, or a tactile indication such as vibration of the device) may be provided to the user to guide the user to hold the phone in a better position so that a sufficient number of lines can be detected in the image and used for orientation determination. Subsequently, another indicator (e.g., another buzz or on-screen camera sign) may be provided to show that a sufficient number of lines have been detected to enable orientation determination.

In some implementations, camera sampling (to determine if there are sufficient lines in a new captured image) may be triggered based on a determination that a sensor, such as a gyroscope, measured a rotational change exceeding some pre-determined threshold that warrants capturing a new image to determine the change of orientation based on the new image, e.g., to enable location estimation of the device following the likely change in the orientation of the device as detected by the gyroscope.

Additional implementations may also include satellite power system (SPS) antenna 444 coupled to SPS transceiver 442 to receive satellite signals over link 446. Such signals may be used to improve positioning in conjunction with other positioning signals described herein when template matching 421 is used for position determination. In still further implementations, specialized modules may implement communications which are integrated with template matching such that specialized image processing modules determine peripheral information from the image, and other peripheral information is determined from sensor processing such as processing of accelerometer data. This peripheral data from multiple sources may then be aggregated for use by template matching 421.

In some implementations, mobile device 400 includes a plurality of other hardware modules in addition to camera 401 and orientation sensors 430. Each of other hardware modules is a physical module within mobile device 400. However, while each of the hardware modules is permanently configured as a structure, a respective one of hardware modules may be temporarily configured to perform specific functions or temporarily activated. A common example is an application 424 that may program camera 401 for shutter release and image capture. Additional hardware modules can be, for example, a Wi-Fi transceiver, a satellite navigation system receiver (e.g., a GPS module), a pressure module, a temperature module, an audio output and/or input module (e.g., a microphone), a proximity sensor, an alternate line service (ALS) module, a capacitive touch sensor, a near field communication (NFC) module, a Bluetooth® transceiver, a cellular transceiver, a magnetometer, a gyroscope, an inertial sensor (e.g., a module that combines an accelerometer and a gyroscope), an ambient light sensor, a relative humidity sensor, or any other similar module operable to provide sensory output and/or receive sensory input. In some implementations, one or more functions of the hardware modules may be implemented in software, firmware, or any combination of such.

Mobile device 400 may include a component such as a wireless communication module which may integrate antenna 414 and wireless transceiver 412 with any other hardware, firmware, or software necessary for wireless communications. Such a wireless communication module may be configured to receive signals from various devices such as data sources via networks and access points. In addition to other hardware modules and applications 424 in memory 420, mobile device 400 may have a display output 403 and a user input module 404. Display output 403 graphically presents information from mobile device 400 to the user. This information may be derived from one or more applications 424, one or more hardware modules, a combination thereof, or any other suitable means for resolving graphical content for the user (e.g., by operating system 423). In certain implementations, template matching 421 may display an image such as image 140 and may further display peripheral information, target object information, pose information, matching information, location information, and any other such information which may be derived from or be useful as part of a template matching system.

Display output 403 can be liquid crystal display (LCD) technology, light-emitting polymer display (LPD) technology, or some other display technology. In some implementations, display output 403 is a capacitive or resistive touch screen and may be sensitive to haptic and/or tactile contact with a user. In such implementations, the display output 403 can comprise a multi-touch-sensitive display. Display output 403 may then be used for settings, output information, or other user interface components of template matching 421. In various implementations, when a match is made, this determination may be output on display output 403. In certain implementations, this may include user feedback to indicate that the match is correct or incorrect. Alternatively, mobile device 400 may have a set of interface or display systems which are altered, so that performance of a template matching system may be adjusted to improve matching time at the expense of accuracy or some other performance metric.

In some implementations, the display of the device may also present a map of the area in which the user is located. For example, a map of the area in which the user is located may occupy a majority of the display surface, while the image captured by the camera may be presented on the remaining area of the display surface (e.g., in a small rectangular area at one corner of the display surface). Alternatively, the image captured by the camera may be presented on a majority of the surface of the display, with the map of the area in which the user is located occupying a smaller portion of the display surface (e.g., at one of the corners of the display surface). In some implementations, the mobile device may include multiple cameras (e.g., a camera at the back of the device, another camera located on one of its sides, etc.) to thus concomitantly take multiple images of the scene from which multiple vanishing points can be determined, if necessary.

Additional potential implementations of a mobile device may further comprise various portions of computing devices which are detailed below with respect to FIG. 12 and networks as detailed in FIG. 13.

Figure 5:
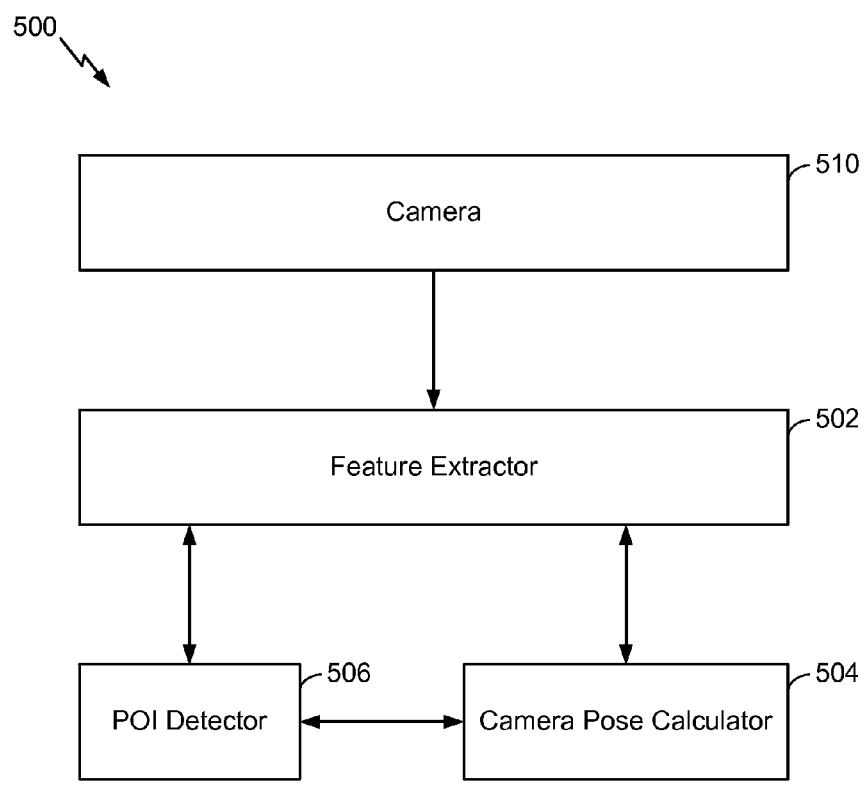
FIG. 5 illustrates aspects of peripheral information according to one implementation.

Referring next to FIG. 5, a system 500 for estimating camera pose based on peripheral information includes a camera 510, a feature extractor 502, a camera pose calculator 504 and a point of interest (POI) detector 506. The feature extractor 502, camera pose calculator 504 and POI detector 506 can be implemented in hardware (e.g., in the processor 410 of mobile device 400 or in another processor or hardware element—see FIG. 4), in software (e.g., as computer-executable code stored as application 424 on the memory 420 of mobile device 400 and executed by the general-purpose processor 410), or a combination of hardware and software. The feature extractor 502 receives an image captured by the camera 510 and extracts key points and/or other image features associated with the image. These features are utilized by the camera pose calculator 504 to determine the approximate camera pose or heading associated with the image, as described below.

The POI detector 506 may be considered the portion of the system that performs template matching to identify a target object or point of interest from an image. If available, POI detector 506 may use camera pose information from camera pose calculator 504 and from pose templates stored as part of POI detector 506 as described above in FIGS. 3A-3B. In certain implementations, POI detector 506 may implement multiple recognition techniques, such that pose based matching is used in addition to other POI or target object identification techniques. POI detector 506 thus leverages one or more sources of information to detect points of interest (POIs) or other objects within a captured image. For instance, the POI detector 506 may utilize features extracted from the feature extractor 502 to detect objects, buildings, color patterns, or signs within the image. POI detector 506 may also, in some implementations, determine identities and/or locations of objects within a given image that may be provided a priori to the POI detector 506, e.g., as user input. In this case, the POI detector 506 may assist the feature extractor 502 in identifying image features corresponding to the object and/or peripheral image features within the image.

Here, the camera pose calculator 504 may be configured to estimate the camera pose using, at least in part, an image from the camera 510. The image may have few and localized object key points (e.g., key points associated with a detected object within a small portion of the image, etc.), and the pose calculator 504 may estimate the camera pose by using peripheral information around the object and peripheral information provided by sensors (not shown in FIG. 5) in system 500. In doing so, operation of the POI detector 506 is decoupled from operation of the camera pose calculator 504. Thus, the POI detector 506 is configured to detect a POI (or other image target such as a storefront logo) within an image based on computer vision techniques while the camera pose calculator 504 is configured to calculate the camera pose associated with the image based on information such as lines and edges from building structures or the like. Pose calculation may be performed by the camera pose calculator 504 independently of operation of the POI detector 506, such that the camera pose calculator 504 does not utilize any information derived from the POI detector 506 in determining the camera pose associated with a given image, and vice versa. In other implementations, the POI detector 506 and the camera pose calculator 504 may be implemented together, and/or the camera pose calculator 504 may utilize any information derived from the POI detector 506 in determining the camera pose associated with a given image, and vice versa.

Figure 6:
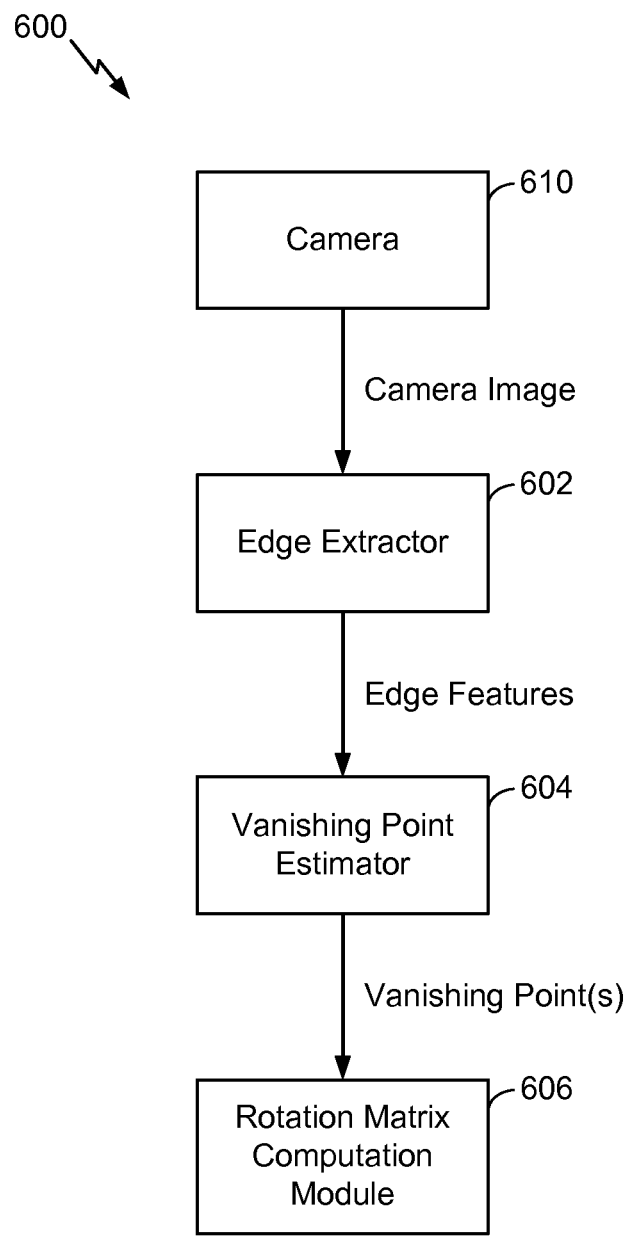
FIG. 6 illustrates aspects of peripheral information according to one implementation.

FIG. 6 illustrates a system 600 for estimating a rotation matrix associated with an image based on converging edge lines detected within the image. This rotation matrix may be used as part of the determination of the pose or relative position between the image or a target object in the image and the camera which captured the image. The system 600 includes the camera 610, an edge extractor 602, a vanishing point estimator 604 and a rotation matrix computation module 606. The edge extractor 602, vanishing point estimator 604 and rotation matrix computation module 606 may be implemented as hardware, software, or a combination of hardware and software. The system 600 may be implemented as sub-components of the system 500 in FIG. 5; for example, the edge extractor 602 may be at least partially implemented by the feature extractor 502 and the vanishing point estimator 604 and rotation matrix computation module 606 may be at least partially implemented by the camera pose calculator 504.

Given an image from the camera 610, the system 600 computes a homography corresponding to the image, e.g., in the form of a rotation matrix associated with the camera with respect to one or more objects in the image. Precise computation of the rotation matrix can be performed if intrinsic parameters of the camera used to capture a reference image and/or test image are known. However, computation of the rotation matrix becomes more difficult if these camera parameters are not known. Here, the rotation matrix computation module 606 provides an estimate of the camera rotation with respect to surfaces in a captured image with varying degrees of accuracy based on peripheral features, such as edge features, identified within the image. In certain implementations, sensor information provides additional peripheral information such as a gravity vector which enables greater accuracy in pose estimation in conjunction with the rotation matrix.

As described above, camera pose estimation as performed by system 600 can be performed independently of object or POI detection. For instance, if the camera 610 is pointed at a storefront, the system 600 can determine a heading angle between the camera and the storefront without knowledge of the identity of the particular storefront. The camera pose estimation, once complete, may be combined with information relating to POIs within view of the camera to provide an estimate of the location of the camera 610 within an area. The POIs within view of the camera may be provided as user input and/or detected through one or more computer vision algorithms. Further, the particular locations of the POIs within a given image may be specified or unspecified without affecting the camera pose estimation performed by system 600.

Figure 7:
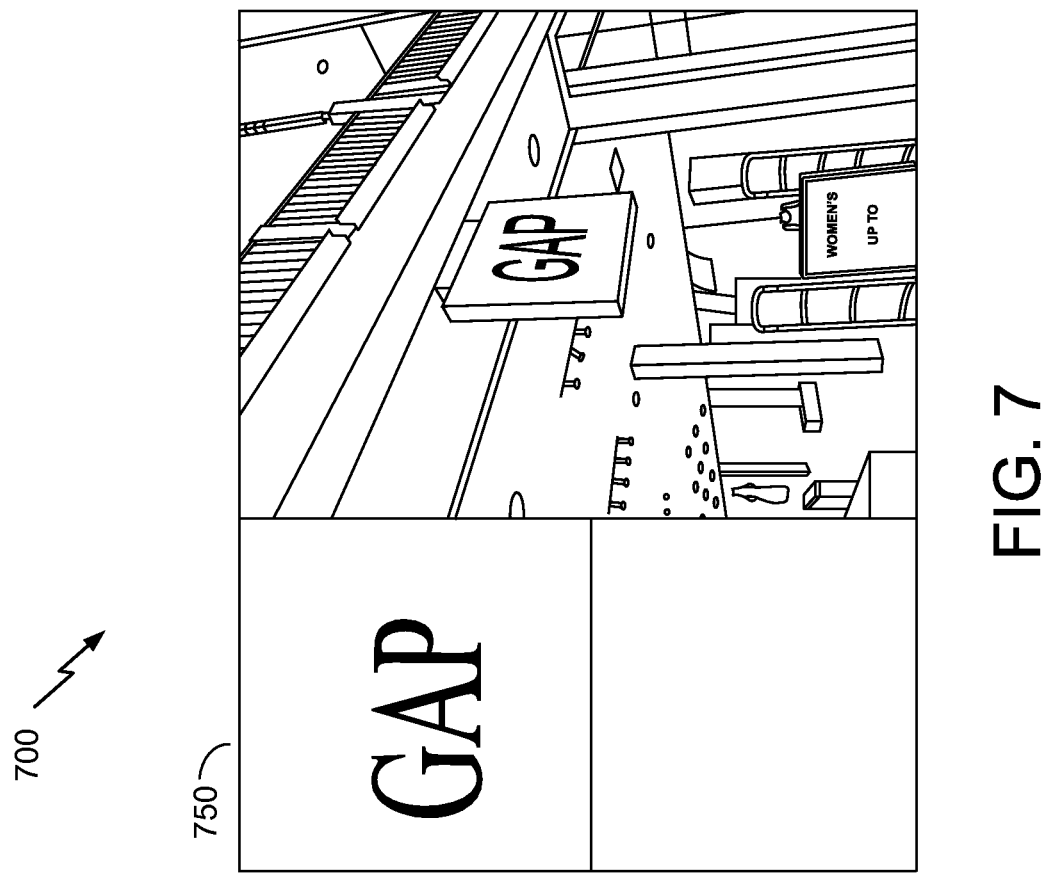
FIG. 7 illustrates aspects of peripheral information according to one implementation.
Figure 8:
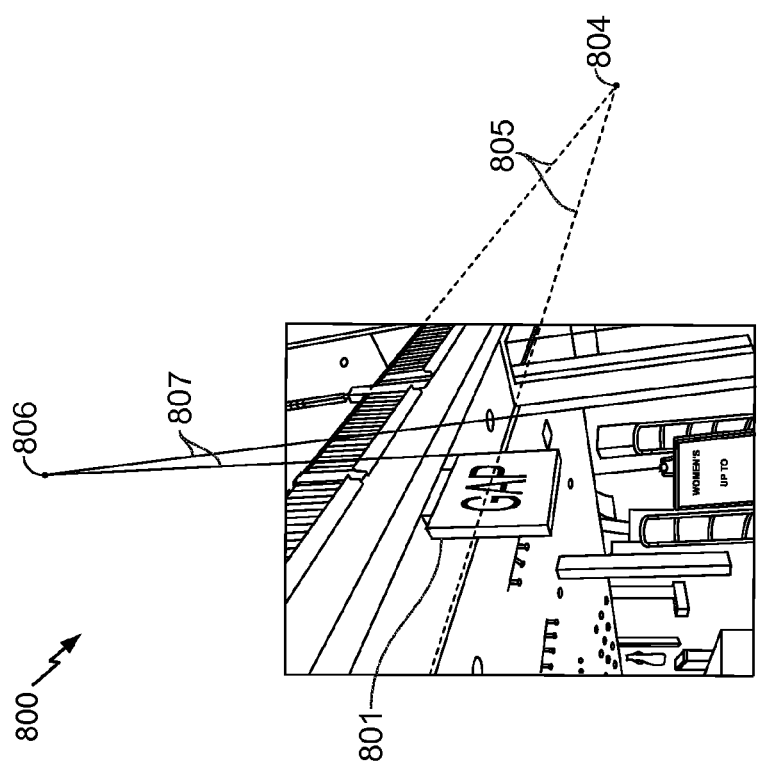
FIG. 8 illustrates aspects of peripheral information according to one implementation.
Figure 9:
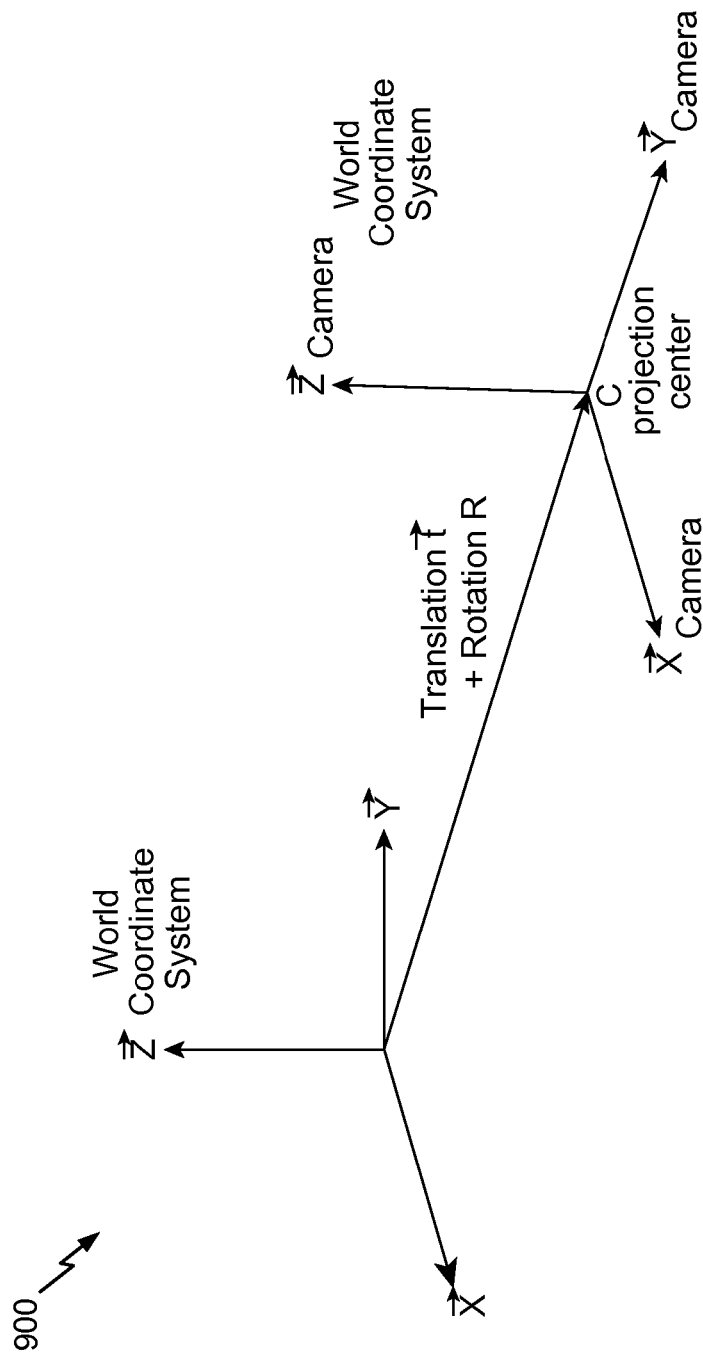
FIG. 9 illustrates aspects of peripheral information according to one implementation.
Figure 10A:
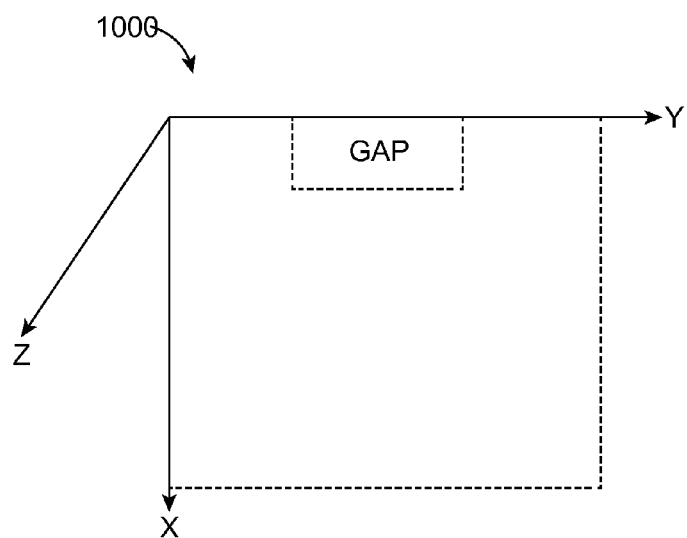
FIG. 10A illustrates aspects of peripheral information according to one implementation.
Figure 10B:
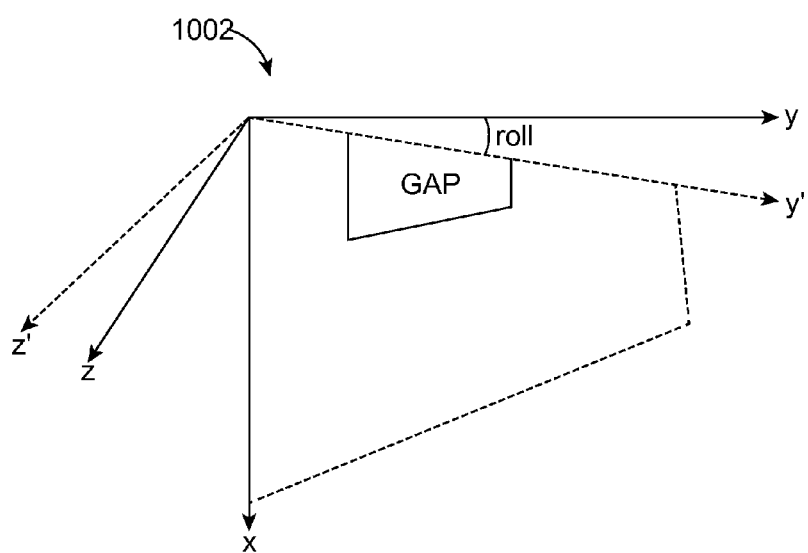
FIG. 10B illustrates aspects of peripheral information according to one implementation.

Referring to FIGS. 7 and 8, images 700 and 800 illustrate an example location for which camera pose estimation can be performed. While images 700 and 800 illustrate a storefront location, the techniques described herein could be applied for any suitable location. For example, the techniques described herein may be applied when a detectable target in the image (e.g., a brand logo provided on a storefront, etc.) is placed on a wall of the location or in a plane that is parallel to the wall, as shown by a store logo 801 in image 800; when the detectable target object is on a planar surface or on parallel planar surfaces, and the camera angle (tilting and rolling) is the angle between the plane of the detectable target of the location and the plane of the camera image; and/or when the structure of the location has a known or common layout, for example, a Manhattan layout such that all edge lines have a fully horizontal or vertical orientation. The logo 750 for the GAP® store is the appearance of the GAP® logo if viewed from straight on, i.e., perpendicular to a sign displaying the logo 750.

Given a structure that corresponds to the above assumptions, the system 600 in FIG. 6 infers the camera rotation angle based on the edge lines around a location within an image. These edge lines can include the edges of the roof, floor, doors, and other edge line features. The edge lines within a given image captured by the camera are extracted (detected) by the edge extractor 602. From these edge lines, the vanishing point estimator 604 attempts to determine one or more vanishing points for parallel edge lines depicted within the image. An example vanishing point is a horizontal vanishing point 804 of some of the edge lines in the image 800. Thus, after POI detection, instead of using key points from the POI (e.g., the store logo in images 700 and 800) for pose estimation, the rotation matrix computation module 606 uses the edges of the roof, floor and doors around the detected POI to infer the camera rotation angle.

The rotation matrix computation module 606 can derive the rotation matrix corresponding to an image from vanishing points associated with the image as follows. For a pinhole camera, a perspective projection from a Euclidean 3D space to an image can be represented in homogenous coordinates with a rotation component R and translation component T as follows:

$$\lambda_i \begin{bmatrix} u_i \\ v_i \\ 1 \end{bmatrix} = K[R \ T] \begin{bmatrix} X_i \\ Y_i \\ Z_i \\ 1 \end{bmatrix} \quad K = \begin{bmatrix} \alpha_u & s & u_0 \\ 0 & \alpha_v & v_0 \\ 0 & 0 & 1 \end{bmatrix}$$
$$R = R_{pan} * R_{tilt} * R_{roll}$$

In the above equations, $\lambda_i$ is a scaling factor, $(u_i, v_i)$ are the 2D image coordinates of locations within the image, $(X_i, Y_i, Z_i)$ are the 3D real-world coordinates of these locations, and K and its components are a matrix of camera-specific parameters. The above coordinate transformation is illustrated by diagram 900 in FIG. 9.

As additionally noted in the above, R is the rotation angle of the camera with respect to the image. R is defined with pan, tilt and roll parameters, which are defined as follows:

Roll: The orientation in the y-z plane is given by the rotation roll around the x-axis. Here, the roll $R_{roll}$ is given by $$\begin{bmatrix} 1 & 0 & 0 \\ 0 & \cos(roll) & -\sin(roll) \\ 0 & \sin(roll) & \cos(roll) \end{bmatrix}.$$

Tilt: The orientation in the x-z plane is given by the rotation tilt around the y-axis. Here, the tilt $R_{tilt}$ is given by $$\begin{bmatrix} \cos(tilt) & 0 & \sin(tilt) \\ 0 & 1 & 0 \\ -\sin(tilt) & 0 & \cos(tilt) \end{bmatrix}.$$

Pan: The orientation in the x-y plane is given by the rotation pan around the z-axis. Here, the pan $R_{pan}$ is given by $$\begin{bmatrix} \cos(pan) & -\sin(pan) & 0 \\ \sin(pan) & \cos(pan) & 0 \\ 0 & 0 & 1 \end{bmatrix}.$$

From these definitions, R can be expressed as follows:

$$R = \begin{pmatrix} \cos(pan)\cos(tilt) & \cos(pan)\sin(tilt)\sin(roll) - \sin(pan)\cos(roll) & \cos(pan)\sin(tilt)\cos(roll) + \sin(pan)\sin(roll) \\ \sin(pan)\cos(tilt) & \sin(pan)\sin(tilt)\sin(roll) + \cos(pan)\cos(roll) & \sin(pan)\sin(tilt)\cos(roll) - \cos(pan)\sin(roll) \\ -\sin(tilt) & \cos(tilt)\sin(roll) & \cos(tilt)\cos(roll) \end{pmatrix}$$

The vanishing points detected within the image are defined to be along the three orthogonal directions. Here, an image is defined as having three vanishing points: $(u_1, v_1)$ on the x-axis, $(u_2, v_2)$ on the y-axis, and $(u_3, v_3)$ on the depth or z-axis. For these vanishing points, the following is derived:

$$\begin{bmatrix} \lambda_1 u_1 & \lambda_2 u_2 & \lambda_3 u_3 \\ \lambda_1 v_1 & \lambda_2 v_2 & \lambda_3 v_3 \\ \lambda_1 & \lambda_2 & \lambda_3 \end{bmatrix} = K[R \ T] \begin{bmatrix} 1 & 0 & 0 \\ 0 & 1 & 0 \\ 0 & 0 & 1 \\ 0 & 0 & 0 \end{bmatrix}$$

For a camera having square pixels and zero skew, and based on the definition of $\lambda_i$ as arbitrary scale factors, the following is further derived:

$$\begin{bmatrix} \lambda_1 u_1 & \lambda_2 u_2 & \lambda_3 u_3 \\ \lambda_1 v_1 & \lambda_2 v_2 & \lambda_3 v_3 \\ \lambda_1 & \lambda_2 & \lambda_3 \end{bmatrix} = \begin{bmatrix} \alpha & 0 & u_0 \\ 0 & \alpha & v_0 \\ 0 & 0 & 1 \end{bmatrix} R$$

From the above equation, the rotation angle R is derived according to the following:

$$R = \begin{bmatrix} \lambda_1(u_1-u_0)/\alpha & \lambda_2(u_2-u_0)/\alpha & \lambda_3(u_3-u_0)/\alpha \\ \lambda_1(v_1-v_0)/\alpha & \lambda_2(v_2-v_0)/\alpha & \lambda_3(v_3-v_0)/\alpha \\ \lambda_1 & \lambda_2 & \lambda_3 \end{bmatrix}$$

In the above, R additionally corresponds to the matrix R=[r1 r2 r3], where each of the components r1, r2, r3 corresponds to a column of R. From this representation of R, the rotation matrix and associated rotation angle can be estimated given three vanishing points $(u_1, v_1)$, $(u_2, v_2)$, $(u_3, v_3)$. The parameters $\lambda_i$ for i=1, 2, 3 are chosen to make each column of R of unit norm.

From the above, a precise computation of the camera rotation angle, pan, tilt and roll can be calculated given two vanishing points identified within an image. For instance, referring back to the image 800 in FIG. 8, calculations can be performed with respect to the horizontal vanishing point 804 of horizontal lines 805 converging to the right of the image 800 and a vertical vanishing point 806 of vertical lines 807 converging above the image 800. Depending on edge line features within the image, a second horizontal vanishing point could also be identified and used. As the 3D coordinate axes (x, y, z and u, v, depth in the image) are perpendicular, if two vanishing points are known, the location of the third vanishing point can be computed based on the known vanishing points, e.g., r3=r1×r2.

For normalization of the rotation matrix, the following definition is made:

$$\sum_{j=1}^{3} R^2(i, j) = 1$$

For images where the camera's horizontal axis is held parallel to the ground, pan=0. In this case, R can be simplified as follows:

$$R = \begin{bmatrix} \cos(\text{tilt}) & \sin(\text{tilt})\sin(\text{roll}) & \sin(\text{tilt})\cos(\text{roll}) \\ 0 & \cos(\text{roll}) & \sin(\text{roll}) \\ -\sin(\text{tilt}) & \cos(\text{tilt})\sin(\text{roll}) & \cos(\text{tilt})\cos(\text{roll}) \end{bmatrix}$$

For implementations in which position is calculated in a 2D map in the x-y plane, the roll angle is estimated. Here, the above calculations are utilized to determine the roll angle, which is the rotation along the y-z plane rotating around the x-axis. An example of this rotation is shown by diagrams 1000 and 1002 in FIGS. 10A-10B.

The estimate may be given within a discrete set of camera rotation states. For example, given possible tilt states, e.g., tilted up, parallel or down to the ground (or, for instance, +15, 0, or −15 degrees), the roll angle may be estimated. In particular, the tilt angle of the camera, or the sign of the tilt angle (e.g., positive (upward) tilt or negative (downward) tilt) is estimated based on determined image features, camera sensor data, or the like. Based on this estimation, the following definitions are employed:

$$\lambda_1 = \begin{cases} \dfrac{1}{\sqrt{\left(\dfrac{u1-u0}{a}\right)^2 + 1}} & \text{if } (u1-u0) \geq 0 \\ \dfrac{-1}{\sqrt{\left(\dfrac{u1-u0}{a}\right)^2 + 1}} & \text{if } (u1-u0) < 0 \end{cases}$$

$$\lambda_2 = \begin{cases} \dfrac{1}{\sqrt{\left(\dfrac{u2-u0}{a}\right)^2 + \left(\dfrac{v2-v0}{a}\right)^2 + 1}} & \text{if } (v2-v0) \geq 0 \\ \dfrac{1}{\sqrt{\left(\dfrac{u2-u0}{a}\right)^2 + \left(\dfrac{v2-v0}{a}\right)^2 + 1}} & \text{if } (v2-v0) < 0 \end{cases}$$

$$\text{tilt} = \sin^{-1}(-1/\lambda_1)$$
$$\text{roll} = \cos^{-1}(\lambda_2(v2-v0)/a)$$

The sign of $\lambda_1$ is determined by $(u_1-u_0)$, and the sign of $\lambda_2$ is determined by $(v_2-v_0)$, given the tilt and roll angles are within −90 to +90 degrees. This provides a rough estimation of the roll (e.g., looking from the left or right). If only a vanishing point in the vertical direction is detected, the range of the roll may be determined in a similar manner to the above.

In addition to the techniques described above, the rotation of the camera with respect to an image can be determined at least partially via orientation sensors (e.g., accelerometers, gyroscopes, etc.) associated with the camera. Thus, in the example above, the tilt of the camera with respect to the earth or a direction of the tilt (e.g., upward or downward) could be computed from acceleration data in addition to, or in place of, image data. For example, a gravity vector determined using information from the sensors may be used to compute the tilt and/or pan of the camera. Additionally, at least a portion of information used for determining the rotation of the camera with respect to an image can be obtained by other means other than the image itself. For instance, such information may be obtained from network measurements by comparing the network measurements to heat map or signature data.

As another example, for images in which multiple targets or surfaces are identified, information relating to each of the detected targets and/or surfaces can be used to further refine the rotation estimate of the camera. For instance, processing for an image that depicts two or more non-parallel walls, such as intersecting walls or an inside or outside corner, may proceed by extracting information corresponding to edge line features and vanishing points for each of the detected walls. The combined information corresponding to each of the detected edge line features and vanishing points may subsequently be used to enhance the accuracy of the rotation estimate of the camera, as described above.

The techniques described above can be applied for a scenario in which any given image captured by the camera 610 contains one object of interest. If multiple objects exist in an image, and the objects are associated with different walls in the surrounding environment, vanishing points corresponding to each of the objects can be identified and used to aid in the calculations described above.

By utilizing the techniques described above, robust rough estimation of camera pose can be performed with respect to a 2D map even when the number and/or placement of key points from computer vision detection are not sufficient for pose estimation on their own. In certain implementations, rough estimation of camera rotation to a storefront or other target object may be performed with horizontal vanishing points only or multiple vanishing points. In certain implementations, a single vanishing point may be used along with a gravity vector. Further, the estimation can tolerate a certain amount of imperfection in the detected lines. For positioning purposes where a map is used, the estimation described herein results in a significant improvement in positioning accuracy.

As discussed above, after a storefront sign or other POI is detected, pose estimation is performed based on the lines around the POI, such as edges of the floor, roof, etc., instead of the POI itself. The camera view of the location may be estimated based on the doors, roof, and/or floor lines that are parallel to the plane of the detected image. Accurate vanishing point position(s) can be used to calculate the pan and tilt angles when the relevant camera parameters are known. When the camera parameters are unknown, rough estimation (e.g., view from left, right, top or bottom) can be performed.

Figure 11:
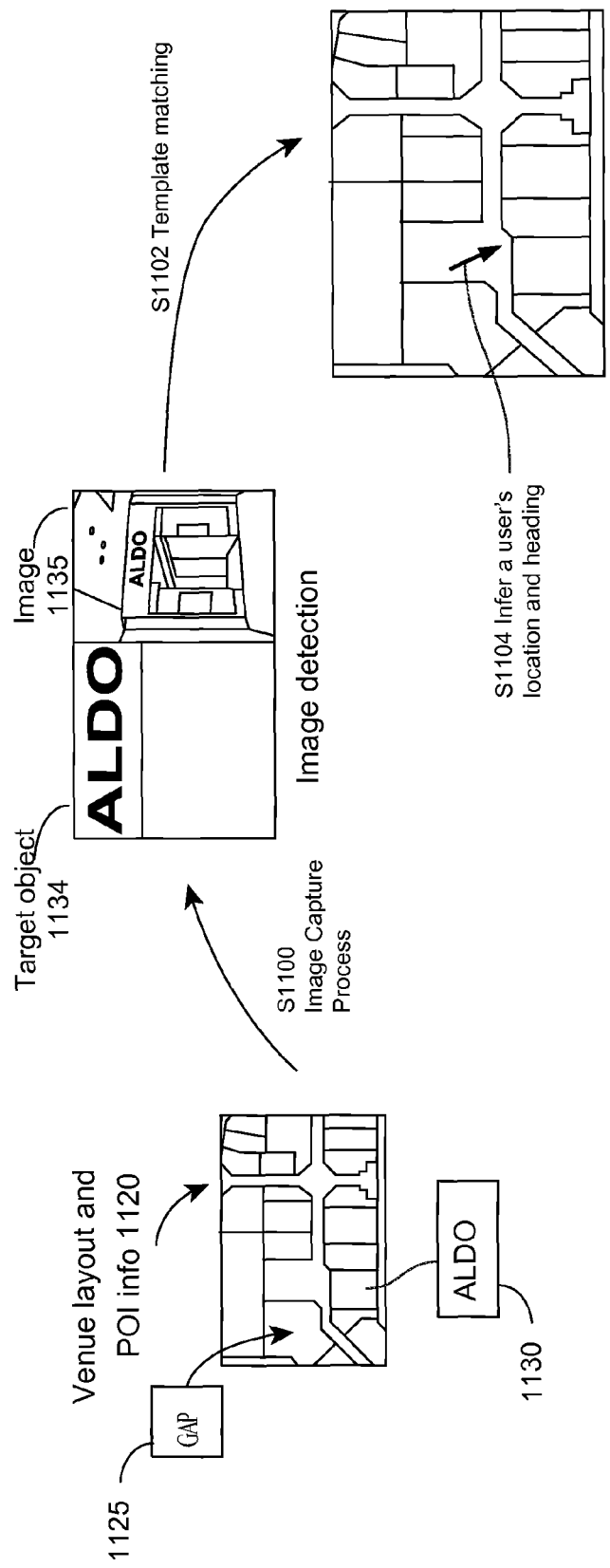
FIG. 11 describes a method of template matching for storefront logo detection using peripheral information.

FIG. 11 illustrates an example implementation of the system shown in previous figures when applied to a vision based indoor positioning system which may use speed-up template matching as described herein. As shown in FIG. 11, venue layout and POI info 1120 includes map and location information for storefronts in a mall environment. This venue layout and POI information 1120 may be provided to a mobile device as part of an application or map directions. In certain implementations, this may be integrated with the template matching system such as template matching 421 of FIG. 4. In alternative implementations, this may be provided as a service from a networked server associated with the location or a location assistance service provider, and the information may be accessed from the server by a mobile device. In certain implementations, this information may only be accessed by a mobile device which is physically in the area represented by the venue layout and POI information 1120, which in other implementations, the information may be generally accessible. Locations for a GAP® and an ALDO® store are shown as locations 1125 and 1130, respectively, as part of venue layout and POI info 1120. If the user does not have access to network or GPS locations signals that provide location information for a user device, the user may capture an image such as image 1135 including target object 1134 as part of an image capture process S1100. A particular storefront with target object 1134 in view of a camera held by a user is thus detected as a visual cue for a position or location service.

In S1102, the template matching system is accessed to match the target object 1134 from image 1135. The template matching system and associated pose templates may be entirely contained within the mobile device which captured image 1135, or may be part of a networked server providing location services as described above. Such a template matching system may include a plurality of templates based on the storefronts in the area represented by venue layout and POI info 1120. This would include a plurality of pose templates from different perspectives from the ALDO® logo and the GAP® logo. A speed-up template matching system using pose information to reduce the number of pose templates checked against image 1135 may then be used to identify a match with target object 1134.

Once the match is made to associate target object 1134 with a particular pose template, venue layout and POI info 1120 may then be used, at least in part, along with the pose information determined as part of the template matching in S1102 to infer a user's location and heading in S1104. Because the venue layout and POI info 1120 will include map location associated with target object 1134, and the pose information will provide heading information associated with the camera which captured image 1135, assuming the user faces the same direction as the camera, the user's heading on a 2D map is inferred based on the camera rotation angle against the wall of the storefront. This angle can also be used to refine the possible location of the user within an associated area.

Figure 12:
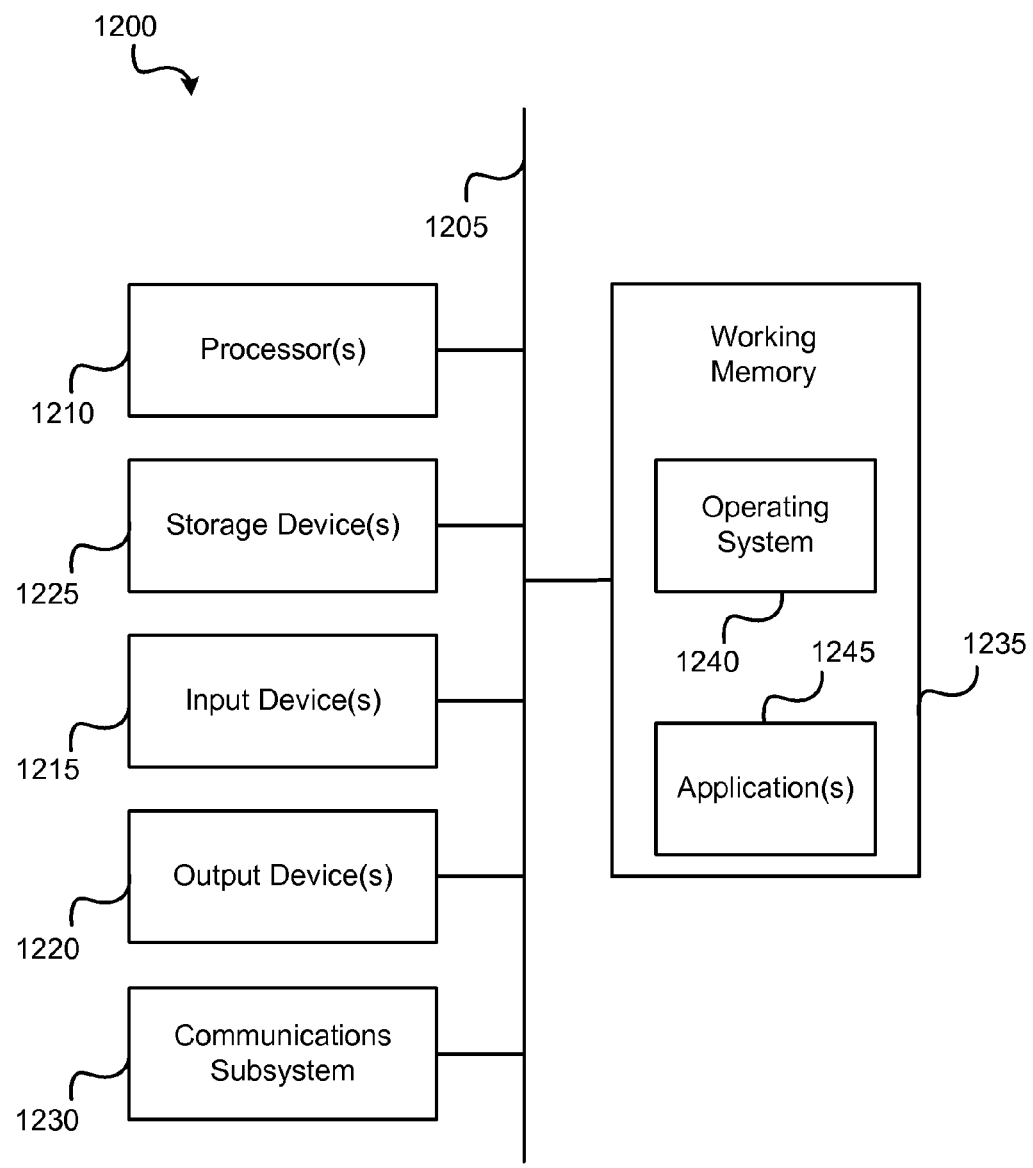
FIG. 12 is a block diagram of an example of a computer system which may be implemented as part of a template matching device or system according to various implementations.

A computer system 1200 as illustrated in FIG. 12 may be utilized to at least partially implement the components and/or the functionality of the previously described computerized devices, such as the devices shown in FIGS. 1 and 4. FIG. 12 provides a schematic illustration of one implementation of a computer system 1200 that can perform the methods provided by various other implementations as described herein, and/or can function as a mobile device or other computer system. FIG. 12 provides a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication with, as appropriate). The hardware elements may include one or more processors 1210, including, without limitation: one or more general-purpose processors and/or one or more special-purpose processors (such as digital signal processing chips, graphics acceleration processors, and/or the like); one or more input devices 1215, which can include, without limitation, a mouse, a keyboard and/or the like; and one or more output devices 1220, which can include, without limitation, a display device, a printer and/or the like. The processor(s) 1210 can include, for example, intelligent hardware devices, e.g., a central processing unit (CPU), a microcontroller, an ASIC, etc. Other processor types could also be utilized.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer system 1200 might also include a communications subsystem 1230, which can include, without limitation, a modem, a network card (wireless or wired), an infrared communication device, a wireless communication device and/or chipset (such as a Bluetooth® device, an 1202.11 device, a WiFi device, a WiMax device, cellular communication facilities, etc.), and/or the like. The communications subsystem 1230 may permit data to be exchanged with a network (such as the network described below, to name one example), other computer systems, and/or any other devices described herein. In many implementations, the computer system 1200 will further comprise, as here, a working memory 1235, which can include a RAM or ROM device, as described above.

The computer system 1200 also can comprise software elements, shown as being currently located within the working memory 1235, including an operating system 1240, device drivers, executable libraries, and/or other code, such as one or more applications 1245, which may comprise computer programs provided by various implementations and/or may be designed to implement methods, and/or configure systems provided by other implementations, as described herein. Merely by way of example, one or more processes described herein might be implemented as code and/or instructions executable by a computer (and/or a processor within a computer). Such code and/or instructions can be used to configure and/or adapt a general-purpose computer (or other device) to perform one or more operations in accordance with the described methods.

A set of these instructions and/or code might be stored on a computer-readable storage medium, such as the storage device(s) 1225 described above. In some cases, the storage medium might be incorporated within a computer system, such as the system 1200. In other implementations, the storage medium might be separate from a computer system (e.g., a removable medium, such as a compact disc), and/or provided in an installation package such that the storage medium can be used to program, configure and/or adapt a general-purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1200) may be used to perform methods in accordance with the disclosure. Some or all of the procedures of such methods may be performed by the computer system 1200 in response to processor 1210 executing one or more sequences of one or more instructions (which might be incorporated into the operating system 1240 and/or other code, such as an application 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein.

The terms "machine-readable medium" and "computer-readable medium," as used herein, refer to any medium that participates in providing data that causes a machine to operate in a specific fashion. In an implementation implemented using the computer system 1200, various computer-readable media might be involved in providing instructions/code to processor(s) 1210 for execution and/or might be used to store and/or carry such instructions/code (e.g., as signals). In many implementations, a computer-readable medium is a physical and/or tangible storage medium. Such a medium may take many forms including, but not limited to, non-volatile media, volatile media, and transmission media. Non-volatile media include, for example, optical and/or magnetic disks, such as the storage device(s) 1225. Volatile media include, without limitation, dynamic memory, such as the working memory 1235. Transmission media include, without limitation, coaxial cables, copper wire and fiber optics, including the wires that comprise the bus 1205 as well as the various components of the communication subsystem 1230 (and/or the media by which the communications subsystem 1230 provides communication with other devices). Hence, transmission media can also take the form of waves (including, without limitation, radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a BluRay® disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200. These signals, which might be in the form of electromagnetic signals, acoustic signals, optical signals and/or the like, are all examples of carrier waves on which instructions can be encoded in accordance with various implementations of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a storage device(s) 1225 either before or after execution by the processor(s) 1210.

Figure 13:
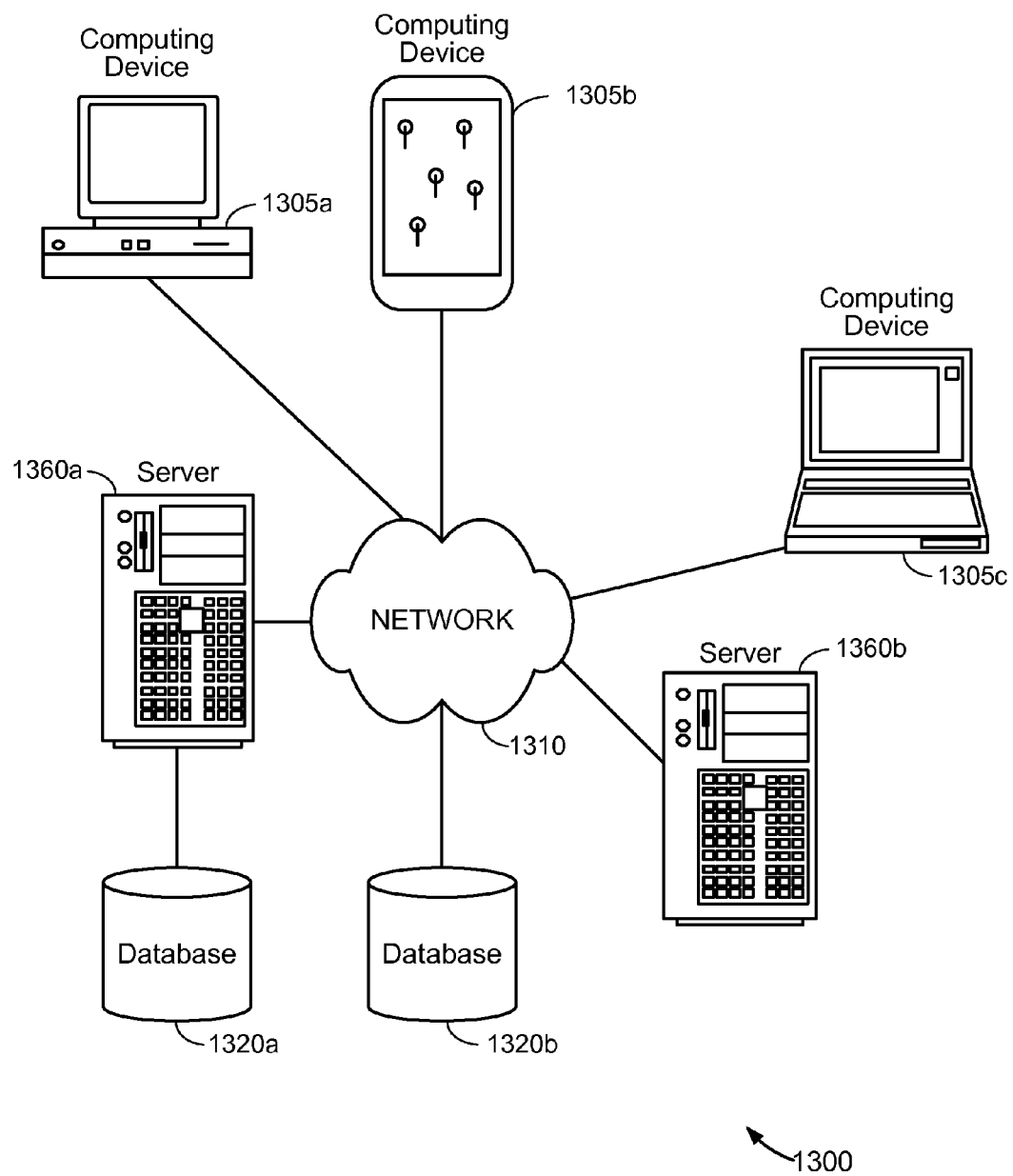
FIG. 13 is a diagram of an example of a computer network which may be implemented as part of a template matching system according to various implementations.

FIG. 13 illustrates a schematic diagram of a system 1300 of networked computing devices that can be used in accordance with various implementations to enable systems for speed-up template matching using peripheral information. For example, in various implementations, the mobile device 400 of FIG. 4 may be a computing device 1305 as shown in FIG. 13 which is coupled via a network 1310 to servers 1360, databases 1320, and other computing devices 1305. The system 1300 can include one or more user computing devices 1305. The user computing devices 1305 can be general-purpose personal computers or workstations. These user computing devices 1305 can also have any of a variety of applications, including one or more applications configured to perform methods of the invention as well as one or more office applications, database client and/or server applications, and web browser applications. Alternatively, the user computing devices 1305 can be any other electronic device, such as a thin-client computer, Internet-enabled mobile telephone, smartphone, tablet, phablet, and/or personal digital assistant (PDA), capable of communicating via a network (e.g., the network 1310 described below) and/or displaying and navigating web pages or other types of electronic documents. Although the system 1300 is shown with three user computing devices 1305*a-c*, any number of user computing devices can be supported.

Certain implementations of the invention operate in a networked environment, which can include a network 1310. The network 1310 can be any type of network familiar to those skilled in the art that can support data communications using any of a variety of commercially available protocols, including, without limitation, TCP/IP, SNA, IPX, and the like. Merely by way of example, the network 1310 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 1302.11 suite of protocols or any other wireless protocol; and/or any combination of these and/or other networks. Network 1310 may include access points for enabling access to network 1310 by various computing devices.

Implementations of the invention can include one or more servers 1360. Each of the servers 1360 may be configured with an operating system, including, without limitation, any of those discussed above, as well as any commercially (or freely) available server operating systems. Each of the servers 1360 may also be running one or more applications, which can be configured to provide services to one or more user computing devices 1305 and/or other servers 1360.

Merely by way of example, one of the servers 1360 may be a web server, which can be used, merely by way of example, to process requests for web pages or other electronic documents from user computing devices 1305. In certain implementations, a server 1360 may operate a location service as described above, with pose template matching performed, at least in part, on one or more servers 1360, and pose templates used for matching stored in a database 1320. The web server can also run a variety of server applications, including HTTP servers, FTP servers, CGI servers, database servers, Java® servers, and the like. In some implementations of the invention, the web server may be configured to serve web pages that can be operated within a web browser on one or more of the user computing devices 1305 to perform methods of the invention. Such servers may be associated with particular IP addresses, or may be associated with modules having a particular URL, and may thus store secure navigation modules which may interact with a mobile device such as mobile device 400 to provide secure indications of geographic points or target objects as part of location services provided to mobile device 400 in order to preserve privacy. In alternate implementations, a server 1360 may provide an application that may be downloaded to a user computing device 1305, where the application comprises template matching modules that may be executed by a computing device locally to provide speed-up template matching based on peripheral information.

In accordance with further implementations, one or more servers 1360 can function as a file server and/or can include one or more of the files (e.g., application code, data files, etc.) necessary to implement methods of various implementations incorporated by an application running on a user computing device 1305 and/or another server 1360. Alternatively, as those skilled in the art will appreciate, a file server can include all necessary files, allowing such an application to be invoked remotely by a user computing device 1305 and/or server 1360. It should be noted that the functions described with respect to various servers herein (e.g., application server, database server, web server, file server, etc.) can be performed by a single server and/or a plurality of specialized servers, depending on implementation-specific needs and parameters.

In certain implementations, the system can include one or more databases 1320. The location of the database(s) 1320 is discretionary: merely by way of example, a database 1320a might reside on a storage medium local to (and/or resident in) a server 1360a (and/or a user computing device 1305). Alternatively, a database 1320b can be remote from any or all of the user computing devices 1305 or servers 1360a,b, so long as the database 1320b can be in communication (e.g., via the network 1310) with one or more of these. In a particular set of implementations, a database 1320 can reside in a storage-area network ("SAN") familiar to those skilled in the art. (Likewise, any necessary files for performing the functions attributed to the user computing devices 1305 or servers 1360 can be stored locally on the respective computer and/or remotely, as appropriate.) In one set of implementations, the database 1320 can be a relational database that is adapted to store, update, and retrieve data in response to SQL-formatted commands. The database might be controlled and/or maintained by a database server as described above, for example. Such databases may store information relevant to levels of security.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for estimating camera pose, the method comprising:
obtaining an image of a location captured via a camera, wherein the image includes a target object and peripheral information;

calculating a pose of the camera with respect to the target object based at least in part on the peripheral information;

accessing a template matching system, wherein the template matching system comprises a plurality of templates for each object of a plurality of objects, and wherein each template is associated with a template pose;

pre-selecting templates of the plurality of templates where the pose of the camera matches the template pose to identify a set of matching pose templates; and processing the set of matching pose templates to identify a template match with the target object.

2. The method of claim 1 wherein the peripheral information comprises vanishing point information derived from processing the image.

3. The method of claim 2 wherein the peripheral information further comprises sensor information collected by a mobile device, wherein the mobile device comprises the camera.

4. The method of claim 3 wherein the sensor information comprises accelerometer data, and wherein the peripheral information comprises a gravity vector determined, at least in part, from the accelerometer data.

5. The method of claim 2 wherein the peripheral information consists of at least two horizontal vanishing points.

6. The method of claim 2 wherein the peripheral information consists of one horizontal vanishing point and a gravity vector.

7. The method of claim 1 wherein pre-selecting templates of the plurality of templates where the pose of the camera matches the template pose to identify the set of matching pose templates comprises:

identifying templates of the plurality of templates with a difference in pose angle of less than a threshold amount; and selecting the templates of the plurality of templates with the difference in pose angle of less than the threshold amount as the set of matching pose templates.

8. The method of claim 1 wherein pre-selecting templates of the plurality of templates where the pose of the camera matches the template pose to identify the set of matching pose templates comprises:

for each object represented by at least template of the plurality of templates, determining the template associated with each object that differs from the pose of the camera by a smallest amount; and selecting the template associated with each object that differs from the pose of the camera by the smallest amount as part of the set of matching pose templates.

9. The method of claim 1 further comprising:

identifying location information associated with the template matching the target object; and estimating the location of the camera based on the location information associated with the template matching the target object and the pose of the camera.

10. The method of claim 9 further comprising:

providing location based services to a mobile device comprising the camera based on the location of the camera.

11. The method of claim 1 wherein the target object comprises a store logo.

12. The method of claim 1 wherein calculating the pose of the camera with respect to the target object based at least in part on the peripheral information comprises:

processing the image to identify a plurality of edge line features of the image.

13. The method of claim 12 wherein detecting the plurality of edge line features comprises detecting horizontal edge line features and vertical edge line features.

14. The method of claim 13 wherein detecting the plurality of edge line features comprises detecting at least one of a floor, a roof, or a door.

15. The method of claim 1 wherein:

calculating the pose of the camera comprises calculating the pose of the camera as at least one of pan, tilt, or roll with respect to a plane, defined with respect to the target object in the image, based on the peripheral information.

16. A mobile device for accelerated template matching using peripheral information comprising:

a processor;

a camera coupled to the processor; and a memory coupled to the processor, wherein the memory comprises instructions that cause the processor to:

obtain an image of a location captured via the camera, wherein the image includes a target object and at least a portion of the peripheral information;

calculate a pose of the camera with respect to the target object based at least in part on the peripheral information;

access a template matching system, wherein the template matching system comprises a plurality of templates for each object of a plurality of objects, and wherein each template is associated with a template pose;

pre-select templates of the plurality of templates where the pose of the camera matches the template pose to identify a set of matching pose templates; and process the set of matching pose templates to identify a template match with the target object.

17. The mobile device of claim 16 further comprising:

a display, wherein the instructions further cause the processor to determine the location associated with the template matching the target object, and to display an estimated location of the mobile device based on the location associated with the template matching the target object.

18. The mobile device of claim 16 further comprising:

an accelerometer, wherein the instructions further cause the processor to identify a gravity vector based on sensor data from the accelerometer, and to calculate the pose of the camera with respect to the target object using the gravity vector in conjunction with the peripheral information from the image.

19. A non-transitory computer-readable storage device comprising instructions that, when executed by a processor, cause a system to perform a method of template matching, the method comprising:

obtaining an image of a location captured via a camera, wherein the image includes a target object and peripheral information;

calculating a pose of the camera with respect to the target object based at least in part on the peripheral information;

accessing a template matching system, wherein the template matching system comprises a plurality of templates for each object of a plurality of objects, and wherein each template is associated with a template pose;

pre-selecting templates of the plurality of templates where the pose of the camera matches the template pose to identify a set of matching pose templates; and processing the set of matching pose templates to identify a template match with the target object.

20. The non-transitory computer-readable storage medium of claim 19, wherein accessing the template matching system comprises communicating, via a wireless network, a request from a mobile device comprising the camera to a server system comprising a database that includes the plurality of templates.

21. A mobile device for accelerated template matching using peripheral information comprising:
   means for obtaining an image of a location captured via a camera, wherein the image includes a target object and peripheral information;
   means for calculating a pose of the camera with respect to the target object based at least in part on the peripheral information;
   means for accessing a template matching system, wherein the template matching system comprises a plurality of templates for each object of a plurality of objects, and wherein each template is associated with a template pose;
   means for pre-selecting templates of the plurality of templates where the pose of the camera matches the template pose to identify a set of matching pose templates; and
   means for processing the set of matching pose templates to identify a template match with the target object.

22. The mobile device of claim 21 further comprising:
   means for identifying a gravity vector;
   wherein the means for calculating the pose of the camera with respect to the target object uses the gravity vector in conjunction with the peripheral information from the image.

23. The mobile device of claim 21 further comprising:
   means for estimating a location of the mobile device based on the location associated with the template matching the target object; and
   means for displaying the estimated location of the mobile device.

24. The mobile device of claim 21 further comprising:
   means for extracting features from the image for use in calculating the pose of the camera; and
   means for detecting points of interest in the image, wherein the points of interest comprise the target object.

* * * * *